United States Patent [19]

Belart

[11] Patent Number: 4,642,989
[45] Date of Patent: Feb. 17, 1987

[54] HYDRAULIC POWER BOOSTER

[75] Inventor: Juan Belart, Walldorf, Fed. Rep. of Germany

[73] Assignee: ITT Industries, Inc., New York, N.Y.

[21] Appl. No.: 613,604

[22] Filed: May 23, 1984

[30] Foreign Application Priority Data

May 28, 1983 [DE] Fed. Rep. of Germany ........ 3319465

[51] Int. Cl.$^4$ .............................................. B60T 13/20
[52] U.S. Cl. ........................................ 60/551; 60/565; 60/574
[58] Field of Search ...................... 60/547.1, 551, 565, 60/574, 576, 577, 548, 560, 563

[56] References Cited

U.S. PATENT DOCUMENTS

| 3,817,152 | 6/1974 | Viron | 91/519 |
|---|---|---|---|
| 3,899,889 | 8/1975 | Swanson | 60/547.1 |
| 4,050,251 | 9/1977 | Carre | 60/574 |
| 4,294,071 | 10/1981 | Jensen | 60/574 |
| 4,305,251 | 12/1981 | Dauvergne | 60/551 |
| 4,313,302 | 2/1982 | Farr | 60/547.1 |
| 4,388,806 | 6/1983 | Szarka | 60/547.1 |
| 4,433,543 | 2/1984 | Thomas | 60/547.1 |
| 4,443,179 | 4/1984 | Wohlrab | 91/519 |
| 4,474,004 | 10/1984 | Thomas | 60/574 |
| 4,490,977 | 1/1985 | Fulmer | 60/547.1 |
| 4,514,981 | 5/1985 | Brown | 60/547.1 |

Primary Examiner—Abraham Hershkovitz
Attorney, Agent, or Firm—James B. Raden; Donald J. Breh

[57] ABSTRACT

The present invention relates to a hydraulic power booster, in particular for the actuation of a master cylinder in an automotive vehicle brake system, wherein there is a booster piston and a brake valve arranged essentially in parallel to the booster piston. In response to an actuating force applied to on a brake pedal, pressure fluid is adapted to be metered into a booster chamber of the hydraulic power booster, the booster chamber being confined by a pedal-operable rod and by the booster piston. In the presence of relatively small actuating forces at the brake pedal, the wheel brakes connected to the working chamber of the master cylinder are supplied with at least the absorption volume required. The booster piston has a projection at the end remote from the pedal extending into a blind-end bore of a master cylinder piston. A hydraulic connection between the blind-end bore and the booster chamber is adapted to be closed by a pedal-operable valve assembly.

10 Claims, 1 Drawing Figure

U.S. Patent  Feb. 17, 1987  4,642,989
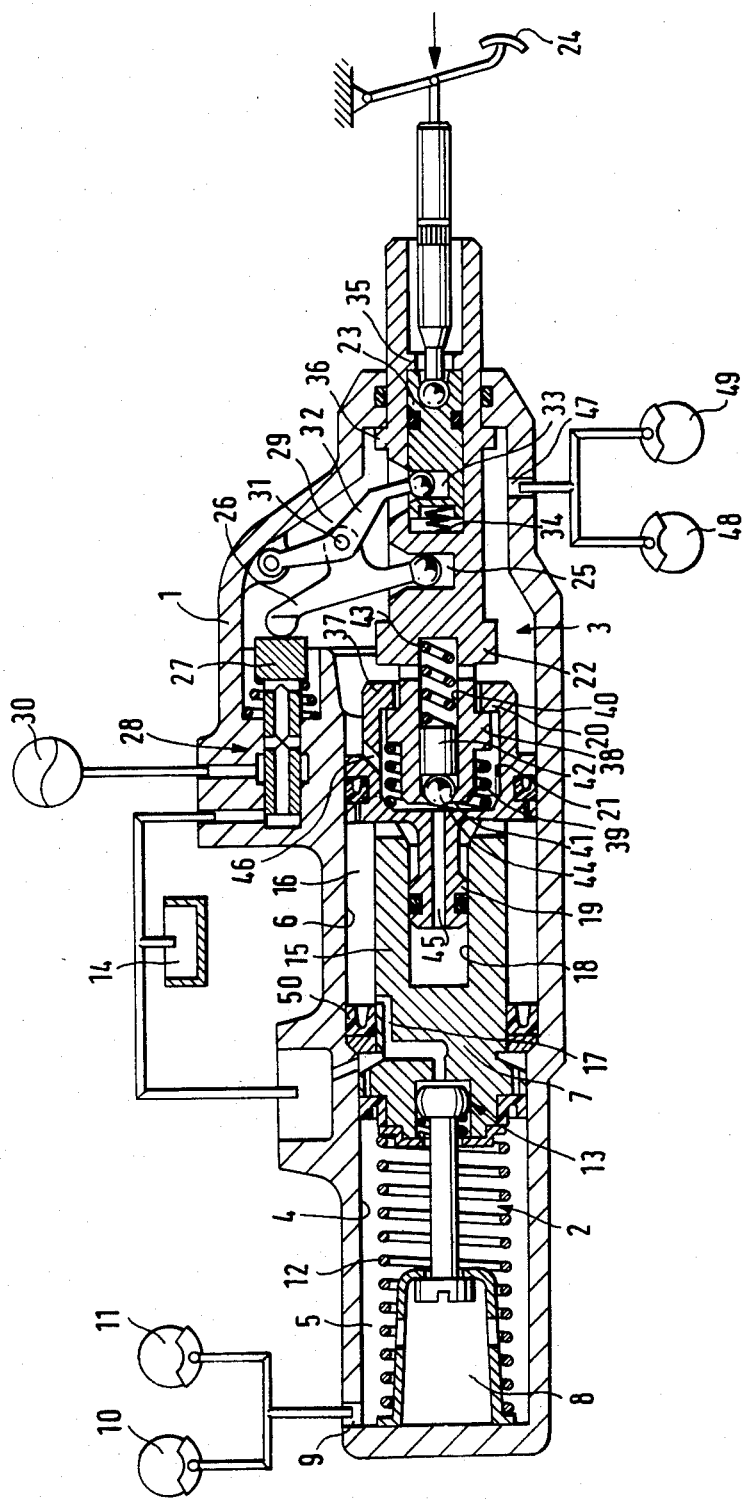

HYDRAULIC POWER BOOSTER

BACKGROUND OF THE INVENTION

The present invention relates to a hydraulic power booster, in particular for the actuation of a master cylinder in an automotive vehicle brake system, with a booster piston and a brake valve which is essentially arranged in parallel to the booster piston and by means of which pressure fluid is adapted to be metered into a booster chamber in dependence upon an actuating force, the booster chamber being confined by a pedal-operable piston rod and by the booster piston.

A device featuring the above characteristics is known from German printed and published patent application No. 31 08 908.9. In the known brake booster, a master cylinder piston is arranged in a first cylinder bore, forming one component together with a booster piston. A web connects the master cylinder piston and the booster piston together. A pedal-side front face of the booster piston confines a booster chamber formed within the housing and is positioned coaxially relative to a pedal-operable piston rod to which is hinged a lever arrangement for the actuation of a brake valve. By exerting a force on the piston rod and by correspondingly actuating the brake valve, a pressure is adapted to be metered into the booster chamber which is proportional to the actuating force and which displaces the booster piston and the master cylinder piston connected to the booster piston in the actuating direction of the brake booster. In this way a corresponding pressure will be built up in the working chamber of the master cylinder. Connected to the working chamber of the master cylinder are wheel brakes that are pressurized in this way. Thus on actuation of the brake pedal, a corresponding slowing-down of the vehicle will ensue.

Upon pressurization of the booster chamber, the piston rod coupled with the brake pedal will likewise be pressurized, so that a corresponding reaction force will be felt at the brake pedal which will provide feed-back information to the vehicle driver regarding the intensity of the braking action initiated by him.

Under certain operating conditions, however, it may be desirable to have a certain volume of fluid supplied to the wheel brakes even before a noticeable reaction force is felt at the brake pedal.

SUMMARY OF THE INVENTION

It is therefore an object of the present invention to provide an improved hydraulic power booster of the type described in the cited reference, so that, in the presence of a first relatively small reaction force at the brake pedal, a correspondingly low braking pressure will be built up in the wheel brakes. The pressure build up ensures that in the initial phase of braking at least the absorption volume that is required for the brake-actuating members connected to the master cylinder chambers is provided.

This object is achieved by the present invention in that the booster piston projects with an extension remote from the pedal into a blind-end bore of a master cylinder piston. A hydraulic connection between the blind-end bore and the booster chamber is adapted to be closed by a pedal-operable valve assembly. A like arrangement ensues in the initial phase of braking, so that a first surface of the master cylinder piston will be pressurized effectively, while after the closure of the valve passage, displacement of the master cylinder piston will be caused by the total surface of the booster piston. The extension remote from the pedal is of smaller diameter than the booster piston so that, in the initial phase of braking, a relatively small force will be exerted on the master cylinder piston, thus causing a relatively small volume to displace from the working chamber of the master cylinder, the volume corresponding approximately to the absorption volume of the brake-actuating members connected to the working chamber. Subsequently, after the closure of the pedal-operable valve assembly, the total surface of the booster piston will be effective so that a correspondingly higher force will act upon the working chamber via the master cylinder piston.

Principally, the pedal-operable valve assembly may be designed in various fashions. However, in a favorable embodiment, the extension of the booster piston contains an axial channel whose port close to the pedal represents a valve seat which forms a valve passage in conjunction with a closure member supported at the piston rod. Preferably, a spring-loaded ball accommodated in a blind-end bore of the piston rod is employed as a closure member, the ball moving into abutment on the valve seat after a predeterminable displacement of the piston rod to keep the axial channel in the extension of the booster piston closed even upon further pressure increase in the booster chamber of the hydraulic power booster.

In an expedient embodiment of the subject matter of the present invention, a pedal-side axial stop is located at the booster piston, against which stop a projection of the piston rod may be supported in the brake release direction. Using a like design the piston rod will respond to brake application to perform a displacement which corresponds to the pedal force, since the axial stop of the booster piston will abut against the projection of the piston rod upon brake application and displace the piston rod in the brake actuating direction. Further, the projection of the piston rod is resiliently biased against the axial stop of the booster piston, ensuring that the valve passage between the booster chamber and the blind-end bore remains open in the brake release position. A stepped piston may be utilized as a master cylinder piston, the piston step of smaller diameter containing the blind-end bore. In this arrangement, the smaller-diameter piston step and the master cylinder bore form an annular chamber connected to an unpressurized supply reservoir. From the annular chamber, volume will be displaced into the working chamber of the master cylinder in the event of displacement of the booster piston in the brake actuating direction. Resulting therefrom will be a so-termed 'pre-charging effect' which ensures that pressure will develop in the working chamber of the master cylinder in the event of a relatively small displacement of the piston rod.

On an emergency actuation of the hydraulic power booster upon failure of the auxiliary hydraulic energy, the master cylinder piston is supported on the booster piston for movement therewith. In the event of brake application under such conditions, the master cylinder piston will then be displaceable mechanically in the actuating direction via the booster piston, whereby it is ensured that, even upon failure of the hydraulic auxiliary energy, hydraulic pressure can develop in the working chamber of the master cylinder which safeguards a minimum deceleration of the automotive vehicle. The present invention provides that the booster piston possesses a larger effective surface than the master cylinder. A like design allows a reduction in the pressure that is required in the booster chamber for the brake application, to thereby permit reduction of the capacity of the components, which are used to make the auxiliary hydraulic energy available. This solution produces a cost effective booster design.

BRIEF DESCRIPTION OF THE DRAWINGS

One embodiment of the present invention will be described in more detail herein by way of a sectional view as shown in the accompanying drawing.

DETAILED DESCRIPTION

In the drawing, reference numeral 1 designates a housing accommodating a master cylinder 2 and hydraulic power booster 3. The master cylinder 2 contains a cylinder bore 4 comprising a portion 5 of smaller diameter and a portion of 6 of a diameter enlarged in relation to the bore portion 5. Guided in the smaller-diameter bore portion 5 of the master cylinder bore 4 is a master cylinder piston 7 which with the housing 1 forms a working chamber 8 that is via a housing port 9 and corresponding pressure lines in hydraulic communication with wheel brakes 10 and 11. The wheel brakes 10 and 11 are preferably arranged at the front axle of an automotive vehicle. The master cylinder piston 7 is biased in the brake release direction by a compression spring 12. Piston 7 has a central valve 13 by virtue of which a connection between the working chamber 8 of the master cylinder 2 and an unpressurized supply reservoir 14 can be interrupted in the event of a corresponding displacement of the master cylinder piston 7 in the brake actuating direction.

With a reduced-diameter portion 15, the master cylinder piston 7 extends into the bore portion 6 of the master cylinder bore and encloses with the housing 1 an annular chamber 16, emanating from which is a connection which runs via the housing channel 17 to the unpressurized supply reservoir 14 in the brake release position as shown in the drawing.

The right-hand end of the master cylinder piston 7, as shown in the drawing, is furnished with a blind-end bore 18 in which an extension 19 of a booster piston 20 is guided in a sealed manner. The extension 19 is an integral component of the booster piston 20 which is sealedly guided in the larger-diameter bore portion 6 of the master cylinder bore 4. The booster piston 20 has a blind-end bore 21 having a pedal-side opening to receive the piston rod 22. The piston rod 22 extends out of the housing 1 in a sealed relationship therewith and receives a central piston 23 that is coupled to a brake pedal 24. Supported in a recess 25 of the piston rod 22 is a first lever 26 whose end remote from the piston rod 22 bears against a valve spool 27 of the brake valve 28 by which a hydraulic connection between a booster chamber 29 and a pressure accumulator 30 and the unpressurized supply reservoir 14, respectively, is controllable.

Via a pivot 31, a second lever 32 is supported at a common pivot with the first lever 26, the said second lever having its upper end pivotally supported in the housing 1, while its end remote from this point of support engages a recess 33 of the central piston 23. The central piston 23 is preloaded against an annular collar 35 of the piston rod 22 by means of a compression spring 34. The piston rod 22 has an annular collar 36 which rests against the housing of the hydraulic power booster in the brake release position, as shown.

The booster piston 20 is provided with a pedal-side stop 37 which embraces an annular collar 38 of the piston rod 22, while a compression spring 39 ensures that the annular collar 37 and the annular collar 38 are engaged in the brake release position. Furthermore, in the brake release position, the compression spring 39 ensures that the left end of the piston rod 22, when viewed in the drawing, is located a specific radial distance from the bottom of the blind-end bore 21 in the booster piston 20. In addition, the piston rod 22 contains a bore 40 whose end remote from the brake pedal 24 is furnished with an axial stop 41. Abutting stop 41 is a valve ball 44 combined with a pressure member 42 and a compression spring 43. The extension 19 of the booster piston 20 incorporates an axial channel 45 which terminates in the bottom of the blind-end bore 21 of the booster piston 20 and which lies opposite the valve ball 44. Normally, a hydraulic connection is established via the axial channel 45 between the booster chamber 29 and the blind-end bore 18 in master cylinder piston 7. There is a chamber receiving the compression spring 39 and confined by the piston rod 22 and by booster piston 20. This chamber is in communication via a pressure fluid channel 46 with the booster chamber 29, at which a housing port 47 is arranged. In addition, wheel brakes 48 and 49 preferably disposed at the rear axle of the automotive vehicle, are connected via corresponding pressure lines to the booster chamber 29 through port 47.

The mode of operation of the described brake system will now be explained in greater detail. In the brake release position as shown in the drawing, the booster chamber 29 of the hydraulic power booster 3 communicates with the unpressurized supply reservoir 14 via brake valve 28. When an actuating force is applied to the brake pedal 24, the central piston 23 moves in relation to the piston rod 22 against the bias 4 compression spring 34 and the second lever swivels clockwise about its point of support at the housing. A like swivelling movement of the second lever ensures that the valve spool 27 of the brake valve 28 will displace to the left, as seen in the drawing, as a result of which first the connection between the booster chamber 29 of the hydraulic power booster and the unpressurized supply reservoir will be closed. Finally, the valve spool of the brake valve 28 assumes an axial position in which a hydraulic connection is completed between the pressure accumulator 30 and the booster chamber 29. The pressure now prevailing in the booster chamber 29 propagates predominantly via the pressure fluid channel 46 and the axial channel 45 contained in the extension 19 to the blind-end bore 18 so that finally the master cylinder piston 7 will be displaced in opposition to the force of the compression spring in the actuating direction. During this displacement the volume of the working chamber 8 is decreased, so that a specific volume of fluid is delivered from the working chamber 8 to the wheel brakes 10 and 11, the volume corresponding at least to the absorption volume of the wheel brakes 10 and 11. The force that is exerted on the master cylinder piston 7 in this phase results from the hydraulic pressure in the booster chamber 29 and from the effective diameter of the extension 19. As soon as the master cylinder piston 7 carries out an axial movement in the actuating direction, the housing channel 17 will be closed by a sleeve seal 50 formed fast with the housing, thereby causing interruption of a hydraulic connection between annular chamber 16 and the unpressurized supply reservoir. In this arrangement, the axial movement of the master cylinder piston 7 is already so great that the central valve 13 is closed in a pressure-tight manner.

Increased force application on the brake pedal 24 causes the piston rod 22 to displace to the left, as viewed in the drawing, so that finally the valve ball 44 moves into abutment on the port of the axial channel 45, whereby a hydraulic connection between the booster chamber 29 of the hydraulic power booster and the blind-end bore 18 in the master cylinder piston 7 is interrupted. Now, the entire surface of the booster piston 20 is effective so that an accordingly increased force will act upon the master cylinder piston 7. Moreover, the pressure prevailing in the booster chamber 29 propagates directly to the wheel brakes 48 and 49 so that all brake-actuating members of the automotive vehicle are pressurized. On withdrawal of the actuating force applied to the brake pedal 24, the described actions are reversed until the movable components of the brake unit will have reassumed their position as seen in the drawing.

Upon failure of the pressure accumulator 30, the brake unit described can be mechanically pressurized in an easy way, considering that braking pressure may of course develop only in the wheel brakes 10 and 11. In the event of the brake actuation, the application of an actuating force on the brake pedal causes the central piston 23 to displace in opposition to the force of the compression spring 34 in the actuating direction, until mechanism contact has been established between the central piston and the piston rod. Now, the piston rod 22 is acted upon by force such that the left end of the piston rod 22, when viewing in the drawing, abuts against the bottom of the blind-end bore 21. When the actuating force on the brake pedal 24 rises, the master cylinder piston 7 will be consequently displaced in the actuating direction after the central valve 13 has closed, the housing channel 17 has been shut and the working chamber 8 has decreased, so that a pressure that is proportional to the actuating force will become effective in the wheel brakes 10 and 11.

What is claimed is:

1. A hydraulic power booster for the actuation of a master cylinder in an automotive vehicle brake system, comprising
    a booster piston,
    a brake valve, said brake valve arranged in parallel to the booster piston and by means of which a pressure fluid is metered into a booster chamber in dependence upon an actuating force on a pedal operated piston rod connected to said brake valve, said booster chamber being confined by said pedal-operated piston rod and by the booster piston,
    the booster piston including a projection at an end remote from the pedal, said projection extending into a blind-end bore of a master cylinder piston, said end defining a first effective surface area of said booster piston, said booster piston having a second effective surface area facing said booster chamber,
    said booster piston including a hydraulic connection between the blind-end bore and the booster chamber,
    normally open valve means in said hydraulic connection operatively connected to said piston rod adapted to be open during an initial movement of said piston rod in an actuating direction,
    said first effective surface area sized to displace said master cylinder piston during said initial movement an amount for delivering a volume of brake fluid from said master cylinder equal to an absorption volume of a pair of brakes connected to said master cylinder, said valve means further adapted to close during movement of said piston rod in the actuating direction in excess of said initial movement, said second effective surface area of said booster being greater than an effective surface area of said master cylinder piston.

2. A hydraulic power booster as claimed in claim 1, in which the projection contains an axial channel having a pedal-side port in the booster piston defining a valve seat which forms a valve passage together with a closure member that is supported at the piston rod.

3. A hydraulic power booster as claimed in claim 2, in which a spring-loaded ball is accommodated in the blind-end bore of the piston rod to form a closure member.

4. A hydraulic power booster as claimed in claim 3, in which there is a pedal-side axial stop on said booster piston on which a projection on the piston rod is supported in a brake release direction.

5. A hydraulic power booster as claimed in claim 4, in which the projection on the piston rod is resiliently preloaded against the axial stop on the booster piston.

6. A hydraulic power booster as claimed in claim 1, in which a stepped piston is employed as the master cylinder piston having a smaller-diameter piston step being provided with the blind-end bore.

7. a hydraulic power booster as claimed in claim 6, in which the smaller-diameter piston step and the cylinder bore form an annular chamber communicating with an unpressurized supply reservoir.

8. A hydraulic power booster as claimed in claims 6 or 7, in which the master cylinder piston is supported on the booster piston.

9. A hydraulic power booster comprising:
    a housing including a booster chamber and a longitudinal bore,
    a master cylinder piston in said bore defining a working chamber, said working chamber including an outlet adapted to have a pair of wheel brake actuating members having a known absorption volume connected thereto;
    a hydraulically operated booster piston in said bore confining said booster chamber and having a first effective surface area and a second effective surface area,
    a pedal operated push rod axially movable between a brake released position and a brake actuated position,
    a hydraulic brake valve operatively connected to said push rod for metering pressurized hydraulic fluid into said booster chamber in dependence on an actuating force on said push rod;
    valve means operatively associated with said push rod and said booster chamber for directing said pressurized fluid to said first effective surface area during an initial movement of said push rod toward said actuated position, said first effective surface area sized to displace said master cylinder piston during said initial movement an amount for delivering a volume of brake fluid from said working chamber equal to said absorption volume of said brake actuating members, said valve means further adapted to direct said pressurized hydraulic fluid to said second effective surface area of said boster piston upon movement of said push rod toward said actuated position in excess of said initial movement thereof.

10. A hydraulic power booster for actuation of a master cylinder in an automotive vehicle brake system comprising; a booster piston and a brake valve, said brake valve arranged in parallel to the booster piston by means of which pressure fluid is metered into a booster chamber in dependence upon an actuating force, said booster chamber being confined by a pedal-operable piston rod and by the booster piston, said booster piston including a projection at an end remote from the pedal extending into a blind-end bore of a master cylinder piston, a hydraulic connection in said booster piston between the blind-end bore and said booster chamber adapted to be closed by a pedal operable valve assembly, and a pedal side axial stop on said booster against which a projection on the piston rod is resiliently preloaded.

* * * * *